July 21, 1964
N. DE WIJN ETAL
VISCOSE DISSOLVER
3,141,656
Filed Jan. 31, 1961
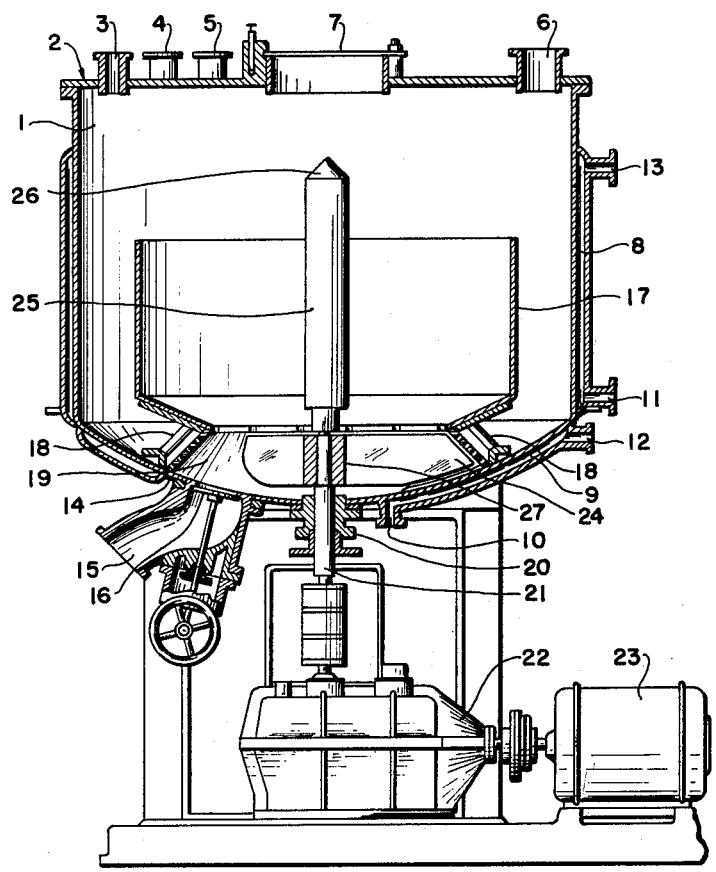
INVENTORS.
NANNING DE WIJN
AREND TEN OEVER
HUIBERT HOLEWIJN
BY Francis W. Young
ATTORNEY United States Patent Office 3,141,656
Patented July 21, 1964

3,141,656
VISCOSE DISSOLVER
Nanning de Wijn, Arnhem, Arend ten Oever, Velp, and Huibert Holewijn, Doorwerth, Netherlands, assignors to American Enka Corporation, Enka, N.C., a corporation of Delaware
Filed Jan. 31, 1961, Ser. No. 86,099
Claims priority, application Netherlands Feb. 17, 1960
5 Claims. (Cl. 259—95)

This invention relates to an apparatus for mixing liquids of different viscosities, and relates more particularly to a viscose dissolver wherein the viscose is mixed with a liquid or liquid of different viscosity to produce a homogeneous liquid mixture.

In a dissolving apparatus heretofore employed, cellulose xanthate and caustic soda from suitable sources of supply were fed into a vessel having a cylindrical guiding tube above the bottom of the vessel and vertical to its axis and having a bladed impeller coaxial with the guiding tube. The mixing vessel was so filled with liquids to be mixed that the level thereof was above the upper end of the guiding tube. In such prior apparatus means were provided to cause the liquid mixture to move downwardly within the guiding tube and then upwardly between the guiding tube and the wall of the mixing vessel. To improve the mixing action, perforated plates were provided inside and/or outside of the guiding tube for the passage therethrough of the liquid mixture. While such prior apparatus operated fairly satisfactorily for the preparation or homogenizing of dispersions, especially dispersions of viscose, the results obtained when liquids of different viscosities were mixed were not as desired. It was found that even after prolonged mixing some of the liquid of lower viscosity floated unmixed on the surface of the liquid of higher viscosity.

It is accordingly an important object of this invention to provide an improved mixing apparatus which will be free from the above and other disadvantages, and which will be especially efficient in homogeneously mixing a liquid of high viscosity with a liquid or liquids of lower viscosity.

Another object of this invention is the provision of an improved mixing apparatus for dissolving viscose and admixing the viscose with a less viscous liquid such as a viscose modifier.

Other objects and advantages of this invention will appear from the following description.

In accordance with this invention the mixing apparatus is provided substantially centrally within the guiding tube of the vessel with an elongated body vertically extending through and preferably above the upper rim of the guiding tube. It was found that the presence of said body within the guiding tube prevents the formation of a zone in which there is normally little or no mixing of the liquids, thus effecting a complete and uniform mixing.

The cross-section of the elongated body may be of any desired configuration and may be polygonal or oval, but is preferably cylindrical. While the cross-sectional area of the elongated body is not especially critical, it is preferred that the cross-section thereof be not substantially different from the diameter of the hub of the impeller. The height of the elongated body is such that it is above the rim of the guiding tube. However, the liquid level may be so adjusted that the upper end of the body extends, during normal operation of the mixing apparatus, above the mixing liquids.

Where an elongated body of cylindrical cross-section is employed, it may be arranged variously within the guiding tube. For example, the body may be exactly centrally of the guiding tube so that the axis coincides with the axes of the guiding tube and the hub of the impeller; however, the body may be positioned eccentrically of the guiding tube and spaced from the axis of the impeller hub. Moreover, be it cylindrical or of other cross-section, the elongated body may be stationary during the mixing operation, or the body may rotate with the impeller.

Optimum results are obtained where the elongated body is cylindrical in cross-section, is mounted centrally of the guiding tube and is rotated by the impeller, i.e. not only is an excellent mixing of the liquids effected, but also the mixing is accelerated. Improved mixing results may be obtained with the use of the elongated body in the guiding tube whether the impeller is driven by a shaft extending upward through the bottom of the mixing vessel or by a shaft extending down through the top of the mixing vessel.

While the mixing apparatus of the instant invention gives the best results when mixing highly viscous liquids with less viscous liquids, it may also be employed for the mixing of liquids of any viscosity, or for dissolving solids in liquids.

Referring now to the drawing wherein a preferred embodiment of this invention is illustrated, the figure is a sectional view in vertical elevation of a mixing apparatus constructed in accordance with this invention.

In the figure of the drawing the reference numeral 1 indicates a mixing vessel in which cellulose xanthate is dissolved in caustic soda and the viscose thus obtained is further mixed with a liquid modifying agent which is less viscous than the viscose. The addition of modifying agents to the viscose for the purpose of facilitating the spinning thereof and to give to the filamentary materials formed therefrom highly desirable properties is well known.

A cover 2 is mounted on the mixing vessel 1, which cover has a plurality of openings 3, 4, 5 and 6 therein for various purposes. Thus, when dissolving cellulose xanthate, the cellulose xanthate may be supplied to the mixing vessel 1 through opening 6, the caustic soda through opening 4 and the modifying agent through opening 5, from suitable sources of these materials, not shown. The opening 3 is connected to a suitable suction device for exhausting the carbon disulfide gas from the vessel. The cover 3 is also provided with a larger opening for the reception of a window 7.

The mixing vessel 1 is surrounded by jackets 8 and 9 each of which has an inlet 10 and 11, respectively, and an outlet 12 and 13, respectively, for a cooling liquid adapted to be circulated through said jackets. At the bottom 14 of mixing vessel 1 there is provided a discharge tube 15 having a valve 16 for controlling the flow of the contents from the mixing vessel.

Inside of and coaxially with the mixing vessel there is mounted a guiding tube 17 which is connected by spaced supporting members 18 to the bottom 14 of the mixing vessel. An annular sieve plate 19 is provided within the periphery of the spaced supporting members 18, sieve apertures being shown in the cross-section of said sieve plate.

A packing box 20 is fixed in the bottom 14 of the mixing vessel and has journaled therein a shaft 21 which extends vertically upwards into the mixing vessel. The lower end of shaft 21 is operatively connected through a gear box 22 to a motor 23 for rotating the shaft. The upper end of shaft 21 is fixed to a multi-blade impeller 24, which impeller is adapted to cause the liquids being mixed to descend through guiding tube 17 and to be forced upwardly through the space between the outside of guiding tube 17 and the wall of the mixing vessel 1.

Above the impeller 24 there is mounted an elongated cylindrical body 25. This body may be fixed in position or, preferably, it may be mounted on an extended portion of shaft 21 to be rotated therewith. The body 25 may be of any suitable diameter, but is preferably somewhat greater than the diameter of the hub 27 of the impeller. The length of the body 25 is such that, during normal operation of the mixing apparatus, the upper end 26 thereof extends above the level of the liquids being mixed. The presence of the cylindrical body 25 within the guiding tube greatly improves the uniformity and speed of mixing of the liquids, the resulting liquid mixture being homogeneous throughout its volume.

It is to be understood that the foregoing detailed description is given merely by way of illustration and that many variations may be made therein without departing from the spirit of this invention.

What is claimed is:

1. A mixing apparatus comprising a vessel having side walls and a bottom for containing liquid to be mixed, a guide tube supported by the bottom of said vessel and extending upwardly therefrom in spaced relationship to said side walls, an impeller rotatably mounted above the bottom and coaxially of said vessel, a drive shaft extending upwardly through said bottom of said vessel and connected to said impeller for rotating it to circulate liquid contained within said vessel about said guide tube, means for rotating said shaft connected with the end of said shaft extending downwardly from said bottom of said vessel, and an elongated body supported within said guide tube and extending above the liquid level for displacing liquid and eliminating a zone wherein poor mixing occurs.

2. A mixing apparatus as set forth in claim 1 wherein said elongated body extends coaxially of said impeller.

3. A mixing apparatus as set forth in claim 2 wherein said elongated body is driven by said impeller rotating means.

4. A mixing apparatus as set forth in claim 3 wherein said elongated body is cylindrical in cross section.

5. A mixing apparatus as set forth in claim 4 wherein the diameter of said elongated body is substantially the same as the diameter of a hub portion of said impeller.

References Cited in the file of this patent

UNITED STATES PATENTS 2,341,185    McLean _____ Feb. 8, 1944
2,461,746    Lathrop _____ Feb. 15, 1949